US008245035B2

(12) United States Patent
Khalidi et al.

(10) Patent No.: US 8,245,035 B2
(45) Date of Patent: *Aug. 14, 2012

(54) MERGING REGISTRY KEYS

(75) Inventors: Yousef A. Khalidi, Bellevue, WA (US); Frederick J. Smith, IV, Redmond, WA (US); Madhusudhan Talluri, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 620 days.

This patent is subject to a terminal disclaimer.

(21) Appl. No.: 11/480,072

(22) Filed: Jun. 30, 2006

(65) Prior Publication Data

US 2008/0005060 A1   Jan. 3, 2008

(51) Int. Cl.
*G06F 21/00* (2006.01)

(52) U.S. Cl. ........ 713/164; 713/165; 713/166; 713/167; 726/1; 726/26; 726/27; 726/28; 726/29; 726/30; 707/736; 707/737; 707/738; 707/748; 707/749; 707/754; 707/755

(58) Field of Classification Search .............. 707/2, 10, 707/101, 102, 103 Z, 104.1, 736–738, 748–752, 707/754–758; 713/100, 164–167; 726/1, 726/26–33; 718/1, 100–104; 719/321
See application file for complete search history.

(56) References Cited

U.S. PATENT DOCUMENTS

| | | | |
|---|---|---|---|
| 5,974,541 A | 10/1999 | Hall et al. ................. 712/228 |
| 6,256,031 B1 | 7/2001 | Meijer et al. ............. 345/357 |
| 6,449,642 B2 | 9/2002 | Bourke-Dunphy et al. .. 709/222 |
| 6,738,974 B1 | 5/2004 | Nageswaran et al. | |
| 6,957,224 B1 | 10/2005 | Megiddo et al. ............ 707/102 |
| 7,010,717 B2 | 3/2006 | Whitlow | |
| 2002/0035625 A1 | 3/2002 | Tanaka ..................... 709/223 |
| 2004/0226023 A1* | 11/2004 | Tucker ...................... 719/315 |
| 2005/0050084 A1* | 3/2005 | Atm .......................... 707/102 |
| 2005/0071378 A1 | 3/2005 | Smith ....................... 707/200 |
| 2005/0102370 A1* | 5/2005 | Lin et al. .................. 709/217 |
| 2005/0144618 A1 | 6/2005 | Howerter et al. ........... 717/174 |
| 2005/0278741 A1 | 12/2005 | Robarts et al. ............... 725/46 |
| 2006/0070030 A1* | 3/2006 | Laborczfalvi et al. ...... 717/120 |
| 2007/0134069 A1* | 6/2007 | Smith et al. ................. 406/39 |

OTHER PUBLICATIONS

Versatility and Unix Semantics in Namespace Unification by Wright et al; Date: Feb. 2006; Publisher: ACM*
Collaborative Management of Global Directories in P2P Systems by Peery et al; Published by Rutgers University; Date: Nov. 1, 2002.*

(Continued)

*Primary Examiner* — Taghi Arani
*Assistant Examiner* — Madhuri Herzog
(74) *Attorney, Agent, or Firm* — Woodcock Washburn LLP

(57) ABSTRACT

Two or more separate physical Registry directories are presented as a single (virtual) Registry directory to an application running in a controlled execution environment called a silo. All of the operations normally available to be performed on the Registry directory can be performed on the merge directory, however, the operating system controls the level of access to the keys in the merge directory. The operating system provides the merged view of the Registry directories by a Registry filter driver. The Registry filter model provides a single callback with a notification code indicating the reason the callback was called. The types of notifications which trigger the special processing include: enumeration of a key, enumeration of the value of a key, query a key, close a key, delete a key, create or open a key or rename a key.

18 Claims, 4 Drawing Sheets

OTHER PUBLICATIONS

Bose, R.P.J.C. et al., "mRegistry: A Registry Representation for Fault Diagnosis", Proceedings of the 5th International Conference on Intelligent Systems and Applications(ISDA), 2005, 37-42.

AppleShare IP 6.3 Developer's Kit, AppleShare Client, Technical Publications, © Apple Computer, Inc, 1999, http://developer.apple.com/documentation/macos8/pdf/ASClient.pdf, 28 pages.

Registry Callbacks, © Microsoft Corporation, 2001, http://www.i.u-tokyo.ac.jp/edu/training/ss/lecture/new-documents/Projects/RegistryCallbacksSpec.pdf, 10 pages.

Registry Toolkit Merge 2.2, Funduc Software, © 1995-2006, http://www.funduc.com/registry_toolkit_merge.htm, 1 page.

Advanced Registry Tracer, http://www.elcomsoft.com/art.html, 2 pages.

* cited by examiner

MERGING REGISTRY KEYS

BACKGROUND

The Registry is a central hierarchical database used in some operating systems including Microsoft WINDOWS 9x, WINDOWS CE, WINDOWS NT, WINDOWS 2000 and WINDOWS XP. The Registry is used to store information required to configure the system for one or more users, applications and hardware devices. The Registry includes information that WINDOWS continually references during operation, such as profiles for each user, the applications installed on the computer, the types of documents that each application can create, property sheet settings for folders and application icons, what hardware exists on the system, the ports that are being used and so on. At times it may be desirable to present a logical view of a registry key that is made up of two or more physical keys.

SUMMARY

Two or more groups of separate physical Registry keys are presented as a single (virtual) Registry directory to an application running in a controlled execution environment called a silo. All of the operations normally available to be performed on the Registry directory can be performed on the merge Registry, however, the operating system controls the level of access to the keys in the merge Registry. The operating system provides the merged view of the Registry keys by a Registry filter driver or other kernel-level operating system code. The Registry filter model provides a single callback with a notification code indicating the reason the callback was called. The callback handler may be implemented as a large switch statement with code to handle various notifications. The types of notifications which trigger the special processing include: enumeration of children keys (sub-keys), enumeration of the value of a key, query a key, query a value, set a value on a key, modify security on a key, load a key, close a key, create or open a key, delete a key or rename a key.

DETAILED DESCRIPTION

Overview

Figure 1:
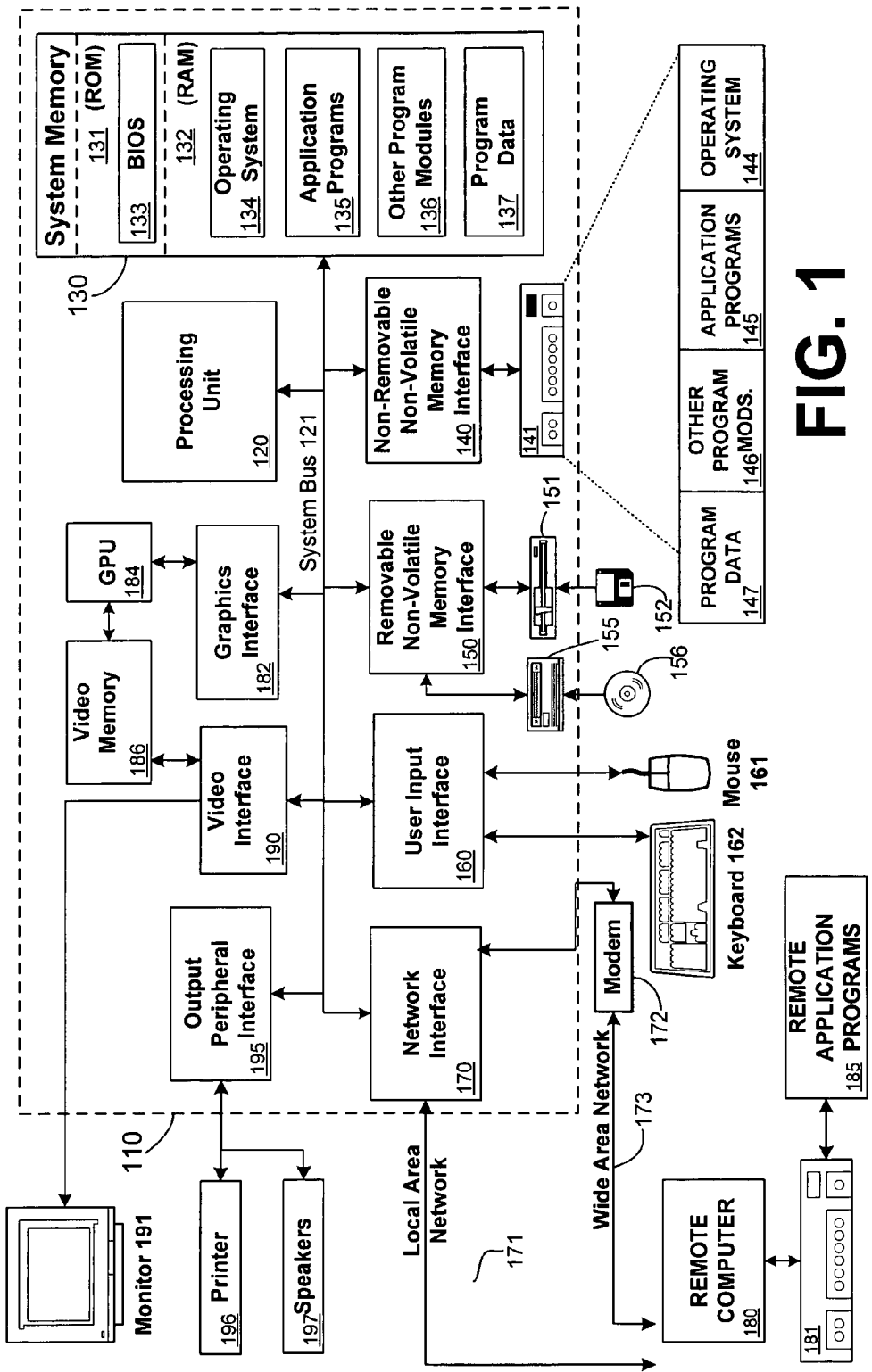
FIG. 1 is a block diagram illustrating an exemplary computing environment in which aspects of the invention may be implemented.

At times it may be desirable to present a logical view of a registry key that is made up of two or more physical keys. For example, it might be desirable to provide a merge between an existing registry key, and a new empty key. New registry keys and values created by the process would go into the initially empty key, but all the state from the existing registry would be visible to the process. This allows a process to store its "private" changes in a separate key, and not modify a shared "public" portion of the registry. Typically, however, current known operating systems provide all processes with the same view of the Registry keys.

In many systems, limited points of containment in the system exist at the operating system process level and at the machine boundary of the operating system itself, but in between these levels, security controls such as Access Control Lists (ACLs) and privileges associated with the identity of the user running the application are used to control process access to files and directories. There are a number of drawbacks associated with this model. Because access to system resources is associated with the identity of the user running the application rather than with the application itself, the application may have access to files and directories that the application does not need, as demonstrated by the example above. Because multiple applications may be able to modify the same file, incompatibility between applications can result. Security problems may also arise, as one application may maliciously or accidentally interfere with the operation of another application. There are a number of other well-known problems as well.

An intra-operating system isolation/containment mechanism called herein a silo provides for the grouping and isolation of processes running on a single computer using a single instance of the operating system. A single instance of the operating system divides the processing space for the system into multiple side-by-side and/or nested execution environments (silos) enabling the controlled sharing of some Registry keys and restriction of access to other keys. The operating system controls Registry key sharing and access by creating different views of the Registry for each silo. The view appears to processes running in the silo to be a single directory which is the union of two or more sets of contributing keys. That is, the keys available to an application depend on which silo the application is running in and the Registry that an application running in a silo "sees" is created by apparently merging two or more sets of keys. The single OS image serving the computer or computer system thus provides a different view of the Registry so as to control which process, group of processes, application or group of applications can use which keys and whether the application can read or read and write keys. Access to keys and the degree of access to keys is therefore directly associated with or based on the silo that the process, application, group of processes or group of applications is placed in and is not determined by user privileges.

Merge directory support for the Registry may be implemented via a Registry filter driver or other kernel-level operating system code. The Registry filter model provides in some embodiments a single callback with a notification code indicating the reason the callback was called. The callback handler thus in some embodiments is a large switch statement with code to handle various notifications. Notifications receiving special processing include enumeration of Registry key, enumeration of the value of a Registry key, query information concerning a Registry key, query a value, set a value on a key, modify security on a key, load a key, close key, create key and rename key. A create key notification is received when a caller wants to create or open a registry key. The driver examines the name of the key being accessed and determines if special handling is required. If the process issuing the request is not in a silo, no special processing is required. If the process issuing the request is in a silo, the merge key metadata for the silo issuing the request is retrieved. If the key name being accessed is within a merge key, special processing is performed. If the key exists in the private location, (silo-specific Registry keys), the private location is used when forwarding the request. If the key does not exist in the private location, the public location is examined for the key. If the key exists in the public location, (global Registry keys), the public location is used when forwarding the request. If the key does not exist in the public or private location, information is returned so that either an error can be returned (i.e., an error indicating failure to open a key which does not exist) or the key can be created. If the key name being accessed is not within a merge key, no special processing is performed. If special handling was performed, metadata is associated with the key.

If metadata were associated with a request during a create key operation and the request to open the key was successful, the metadata is attached to the key. When a key is closed, any metadata associated with the key is deleted. When a client application tries to enumerate the sub-key values for an open key, a special handler is invoked. Any metadata associated with the key is retrieved. If metadata is found, and the metadata indicates that the key is a merge key, the contents of the list of keys which exist in each of the contributing keys is returned to the caller.

The registry API for querying keys in some embodiments is implemented by passing in an index, and returning the result. For a given index the contents of the contributing keys are considered, what should be returned for that index is determined, and is returned. The current location in each of the contributing directories during the enumeration is tracked, and the appropriate next value is returned each time. That is, all the results from one contributing key are returned. Results for subsequent keys are returned if the same key name has not already been enumerated. If the caller looks at an index below the current index, the internally cached index's are reset and processing is restarted. Sub-keys in a key or values in a key can be enumerated. Sub-keys or values are returned to the caller, as requested. If a request is received requesting the name of a key, the silo relative name rather than the physical name of the key in the registry is returned. Thus if a request to retrieve key information is received, the information is retrieved and the requested information is updated so that it matches the information the caller expects. For example, suppose a name of a key is requested. The name of the key is retrieved and the name that is sent back to the caller is updated so that it matches the name the caller used to open the key—keeping the illusion that all of the contents of the contributing keys are in the same merge key. If a key is being renamed, the new name, or new location is validated based on the "merge" directory view exposed to the application. Thus, if the user wants to move the key to a new location, the new location is updated based on the silo's view of the namespace.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Merging Registry Keys in a Computer System

The operating system monitors registry access requests made by a process running in a silo. Multiple silos may exist on the computer or in the computer system at the same time. Multiple processes may execute within each silo. A single operating system image creates the silos and creates and monitors all the processes in all the silos. A silo-specific view of a registry key is created by the operating system by an apparent merging of two or more physical backing stores (registry keys) together into what appears to the silo to be a single key. That is, two or more separate registry keys may be exposed to a silo (and the processes running within the silo) as a single key. One or more of the physical backing stores may be used to build a portion of the silo-specific view for one or more of the silos.

Figure 2:
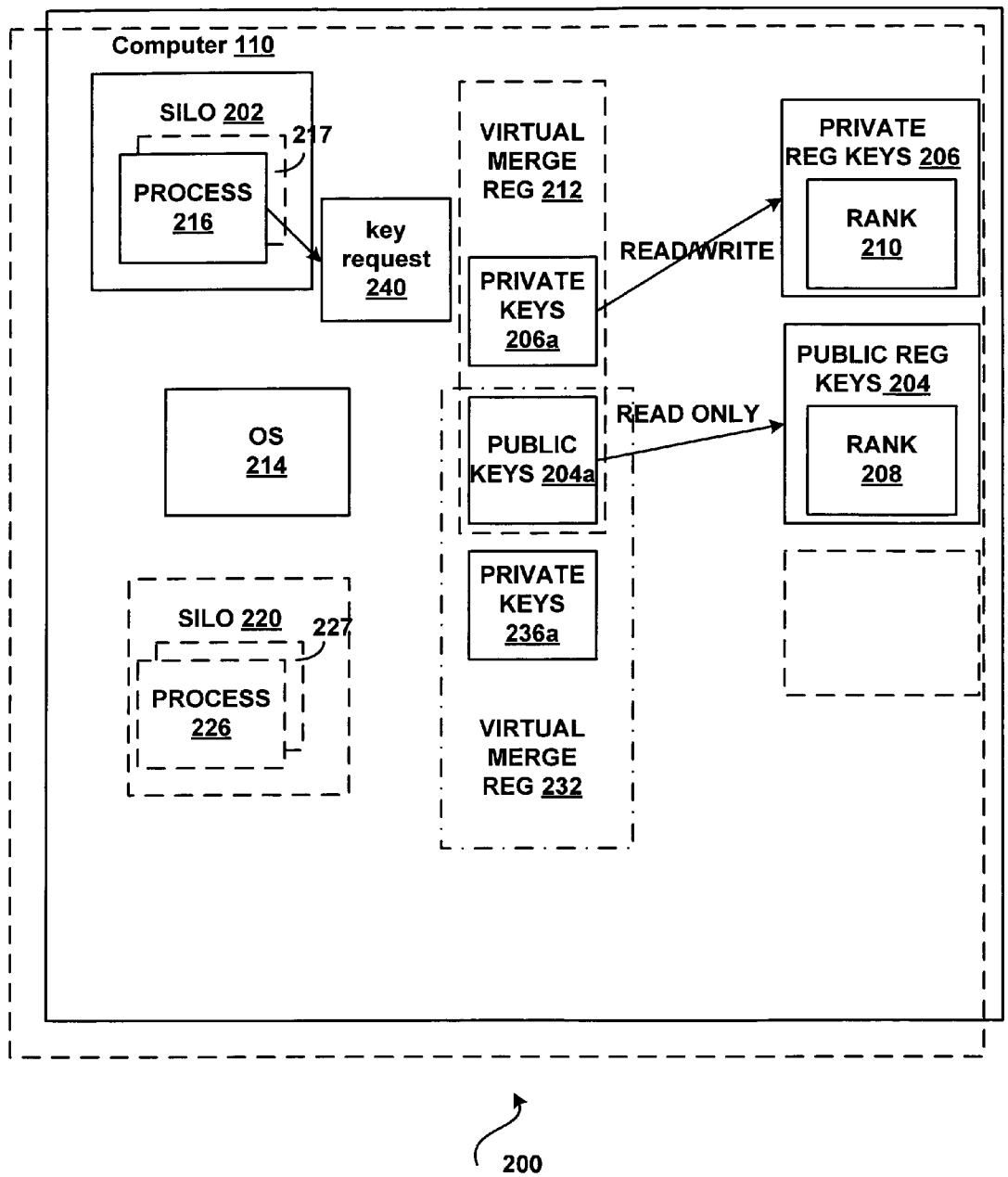
FIG. 2 is a block diagram of a system for merging Registry keys in accordance with some embodiments of the invention.

FIG. 2 illustrates one embodiment of a system 200 for merging registry keys directories as described above. System 200 may reside on one or more computers such as computer 110 described above with respect to FIG. 1. In FIG. 2, one or more execution environments may be running on computer 110. One type of execution environment contemplated is a silo, (described more fully above). In FIG. 2, silo 202 and silo 220 are depicted. Silos may be nested, that is, silo 202 may itself include a silo (not shown). Silos may be nested to any desired level. A silo nested inside another silo is sometimes referred to as a child silo, and the silo in which it is nested is sometimes referred to as its parent silo. A parent silo may control the degree to which its resources (including files and registry keys) are available to its child silos.

A silo may be used to create an isolated execution environment so that resources associated with one silo are available to processes running within that silo but are not accessible to other silos running on the computer or on other computers in the computer system or computer network. For example, if silo 202 were an isolated execution environment a resource (not shown) available to process 216 running in silo 202 would be unavailable to a process such as process 226 running in a second silo, silo 220. A second process running in silo 202 (such as process 217) would however, have access to that resource. Similarly a resource available to processes 226 and 227 would be unavailable to processes 216 and 217 running in silo 202.

Alternatively, in accordance with embodiments of the invention, a silo may be used to create a semi-isolated or controlled execution environment in which some resources are shared and some resources are not shared or in which some portions of a resource are shared and other portions of the resource are not shared. One such contemplated resource is the Registry. For example, in silo 202 one or more processes such as process 216 and 217 may be running and have access to a Registry. In some embodiments of the invention, the Registry is a virtual merged directory of keys 212, wherein the virtual merge Registry 212, although appearing to processes 216 and 217 as a single physical directory is actually a virtual view of the union of two or more sets of Registry keys created by the operating system using callbacks to perform special processing for certain types of operations under certain circumstances. The view created by the operating system 214 may comprise the union of the public keys of the Registry and private or local (to the silo) keys merged together to create the virtual merge Registry. In some embodiments of the invention, duplicate keys are collapsed, with the values of the private keys being used when there is a duplicate key. For example, one of the keys in the public Registry is \registry\machine\software. The key, may, for example, be a location where an application can write machine global state. It is desirable to allow an application running in a silo to write its own state in its own copy of \registry\machine\software (i.e., \registry\machine\silo0000software) but to enable the silo to share the state in the public version of \registry\machine\software. In this way the silo is able to see any changes made in the external system but can make its own changes or write new keys which will only exist in its private location and thus will not affect the system external to the silo. Hence the Registry keys \registry\machine\software and \registry\machine\silo0000software are merged. The silo will see a key called \registry\machine\software but its contents will be the combination of the physical \registry\machine\software and \registry\machine\silo0000software. Thus the merge Registry created by the operating system in some embodiments of the invention includes the value of the global keys while a private, unshared portion of the key is associated with a particular silo (e.g., with silo 202), and may represent, for example, local or private keys for applications running in that silo. For example, in FIG. 2, a virtual merge key 212 associated with silo 202 includes a shareable portion 204a derived from the value of the global key 204 and an unshareable (private) portion 206a derived from the value of a local key (e.g., a private, unshared key 206 associated with silo 202). A virtual merge Registry 232 associated with silo 220 includes a shareable portion 204a derived from the value of a global key 204 and an unshareable portion 236a derived from the value of a local key (e.g., a private, unshared key 203 associated with silo 220). In some embodiments of the invention, the shareable portion 204a of the key 212 is read-only while the private, unshared portion 206a of the key 212 is read-write, although it will be appreciated that the contemplated invention is not so limited. That is, the private portion of the virtual merge Registry keys may be read-only or read-write or may include portions which are read-only or read-write. Similarly, the shareable portion of the virtual merge Registry keys may be read-only or read-write or may include portions which are only read-only or read-write. Moreover, it will be appreciated that the invention as contemplated is not limited to merging two values or two sets of keys. Any number of keys (n keys) may be merged to create the virtual merge Registry. The virtual merge Registry in some embodiments of the invention is not persisted on permanent storage or created per se in memory but is dynamically deduced by the operating system 214 as required, by monitoring Registry key access requests and performing special processing associated with the type of access request as described more fully below.

Thus, it will be appreciated that as more than one silo may exist on a computer or in a computer system at one time, more than one view of the Registry may also exist at one time, that is, there is a one-to-one correspondence between silo and virtual merge Registry but any number of silos and merge views may exist at any one time on a particular computer or computer system. Moreover, a portion of each key in the virtual merge Registry may include a shareable portion which may or may not be the same for all silos in the computer system and may or may not be identical to physical backing Registry 204. In some embodiments of the invention, all of the applications or processes running within all the silos in the system share a single shareable portion of the silo's merge Registry which may or may not exist on the particular computer on which the silo is running. Moreover, the physical directory which "backs" a shareable or unshareable portion of the merge Registry may exist on removable media, such as a removable disk, CD ROM, USB key, etc. Similarly, the physical backing Registry may reside on a remote system. The same is true for the private or unshareable portion of the keys of the merge Registry and its backing store.

In some embodiments of the invention, the mechanism in the operating system 214 which creates the merged view of the Registry (e.g., merged keys 212 and 232) is a filter driver which is able to insert itself into the code paths of operations by registering callbacks. In some embodiments of the invention, the callbacks registered for include RegNtPreCreateKeyEx(Ex), RegNtPostCreateKeyEx(Ex), RegNtPreQueryKey, RegNtPreEnumerateKey, RegNtPreEnumerateValueKey, RegNtPreRenameKey and RegNtPreKeyHandleClose, although it will be appreciated that other callbacks may be registered. In some embodiments of the invention, the operations for which special processing (e.g., via callbacks) is performed are enumeration, open, create, rename and close operations for Registry keys. For example, an enumeration operation may be associated with RegNtPreEnumerateKey and RegNtPreEnumerateValueKey callbacks, open and create with RegNtPreCreateKeyEx(Ex), RegNtPostCreateKeyEx(Ex), close with a RegNtPreKeyHandleClose callback and rename with a RegNtPreRenameKey callback. In some embodiments, when a Registry key access request is sent from a process, the operating system monitors the request via the callbacks and if the operation is one of those for which special processing is to occur, performs the special processing. For example, in FIG. 2 operating system 214 may monitor Registry key access requests such as request 240 initiated by process 216 in silo 202 and perform special processing to create virtual merge Registry 212 from private keys 206 (associated with silo 202) and public keys 204. The portions of the keys in virtual merge Registry 212 deriving from private keys 206 are represented by (virtual) private keys 206a and the portions of virtual merge Registry 212 deriving from public keys 204 are represented by (virtual) public keys 204a.

Each of the contributing (backing store) keys may be associated with a rank, (e.g., in FIG. 2 private (backing store) keys 206 are associated with rank 210, public keys (backing store) 204 are associated with rank 208). Rank in some embodiments is used as a tie breaker when required. For example, if a key access (e.g., open, enumerate, etc.) is requested, and the indicated value exists in two sets of keys under the same name, the rank of the contributing set may be used to determine which value is exposed to the requester, that is, the value of the key in the set of keys having the highest rank is exposed to the requester (as for example, the writable portion of the key). Similarly, if a given name is a key in one contributing directory and the same name is a sub-directory in another contributing set of keys, the entry in the set having the highest rank is exposed to the requestor in some embodiments.

For example, a Registry key enumeration in some embodiments is the union of all the keys from all the contributing sets of keys. If the same name exists in more than one of the contributing sets, the rank of each of the contributing sets is used to determine which set's version of the value should be exposed. When creating a key, if the key does not already exist in any of the contributing sets it will be created in the set with the highest rank. When renaming a key, each of the contributing sets of keys is queried to determine that the new name is not already in use, and if it is not, then the key will be renamed to the new name.

Figure 3:
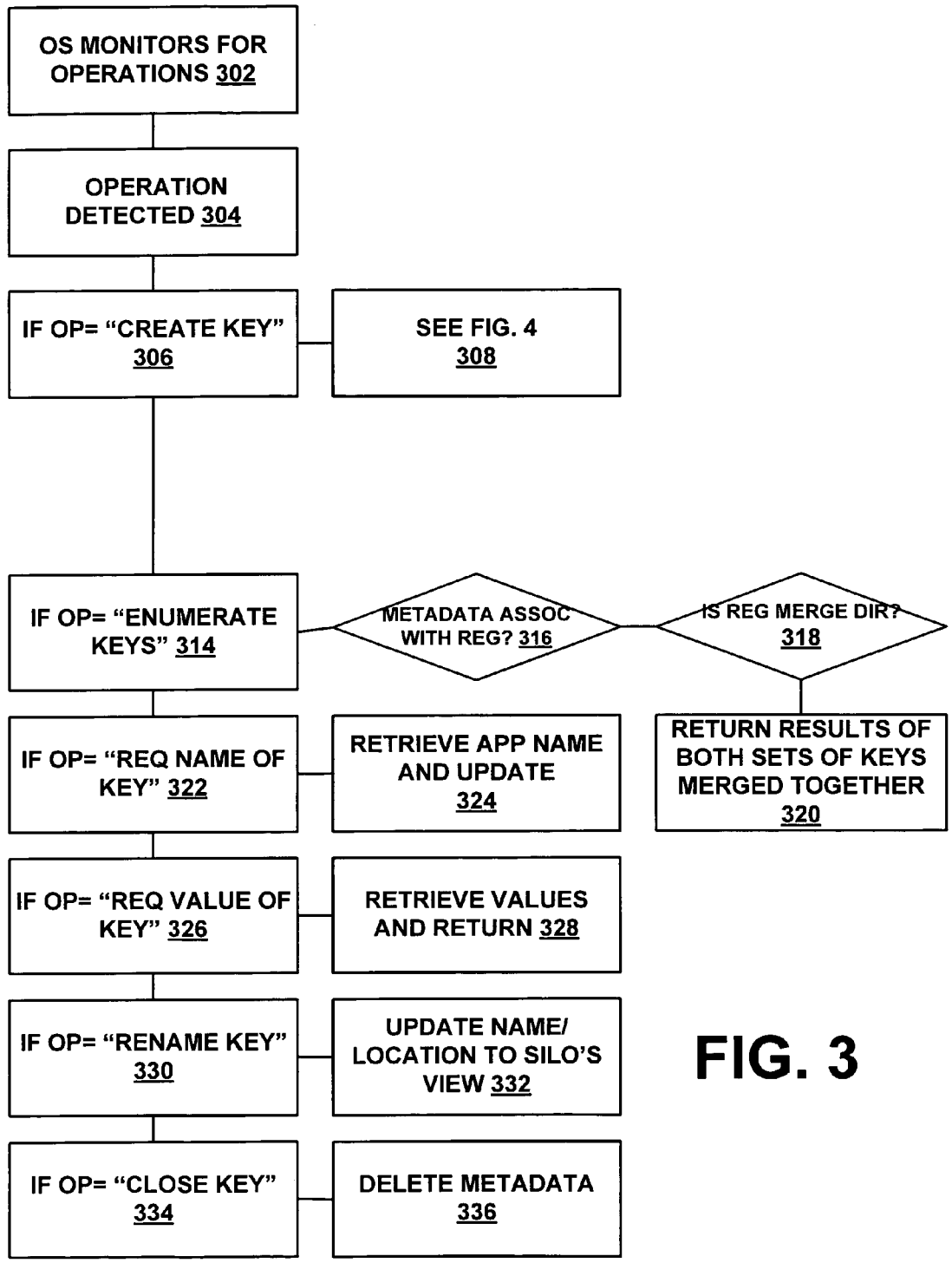
FIG. 3 is a flow diagram of a method for merging Registry keys in accordance with some embodiments of the invention.

FIG. 3 is a flow diagram of a method for merging keys in accordance with embodiments of the invention. At 302 the operating system (e.g., OS 214 of FIG. 2) monitors Registry key access requests (such as access request 240 made by process 216 running in silo 202). When a key access request is detected by the operating system (304) (e.g., via callbacks), the operating system 214 determines the type of access request made (306, 314, 322, 326, 330 and 334) and performs the appropriate processing as described more fully below.

Figure 4:
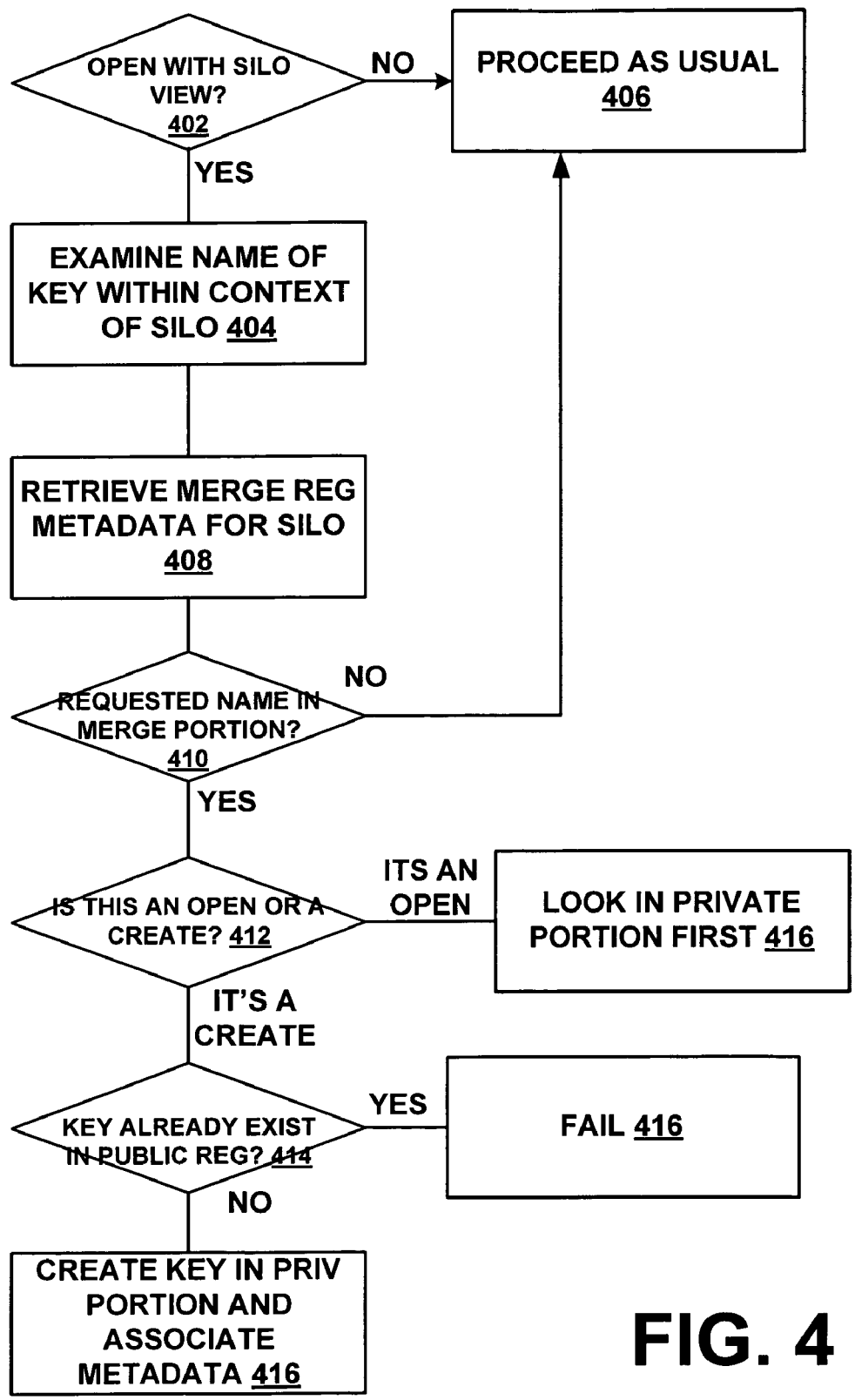
FIG. 4 is a flow diagram of a portion of the method of FIG. 3 in accordance with some embodiments of the invention.

For example, at 306, the operating system may determine that the key access request is an operation that opens or creates a key (306). FIG. 4 is a flow diagram of the processing (308) that may then occur. When an open or create request is sent to a volume on which a merge Registry exists, a create callback (e.g., RegNtPreCreateKeyEx (Ex)) is invoked which enables a filter driver of the operating system to examine the request to determine if special processing is required. When an open or create operation is invoked, an absolute path name or a path name relative to an existing open key is provided. When a relative open is used, name parsing begins at the registry node referenced by the relative handle. In the case of an absolute open, the 10 Manager of the operating system parses the name, the object manager resolves a portion of the name that leads to a device object and passes the unresolved balance of the name (the portion that has not yet been resolved) back to the I/O Manager, along with a pointer to the device object it located. Special processing is required when the portion of the key referred to is the silo view (402) instead of the global portion. As used herein, performing an operation "using the silo view" means that the name of the key is interpreted within the context of the silo's virtual merged Registry instead of within the context of the normal (system) file system directory.

At 402, if the open is an absolute open (not a relative open) and the caller is in a silo processing continues at 404. In some embodiments of the invention, the operating system determines if the open or create key is a relative or an absolute open/create by looking at several fields in the access request. If the access request includes only a key name, and the thread originating the request does not belong to a process running in a silo, the request is considered to be an absolute open. The information stored in the request can be used to retrieve metadata associated with the key (408).

Thus, at 404, the name of the key being accessed is examined within the context of the silo. A new key object is created using the silo view whenever the key referenced in the request was originally opened within a silo. Because all access requests to the key object are filtered, two or more backing objects may be accessed to provide the silo view. The key is also opened using the silo view whenever a relative open instead of an absolute open is used. In some embodiments of the invention, if a field in the request representing an existing open key is not null, the request is considered to be a relative request. If, at 402, the caller is not in a silo or if the original key was not opened in a silo, then processing proceeds as normal (406). If the request uses an absolute name (that is, names the key is explicitly referenced using a path name and the open key field of the request is null), the operating system determines if the process initiating the request (the caller) is in a silo or not. In some embodiments of the invention, the operating system determines if the caller is in a silo by determining if the thread originating the access request is in a silo. Alternatively, in some embodiments the operating system may determine if the caller is in a silo by examining the access request which may be tagged with a silo identifier if the request originated from a caller in a silo. If the caller is in a silo, the key is opened using the silo view and the private value is returned.

Thus, if the key referenced in the request was not originally opened in a silo, or if the request is an absolute open and the caller is not in a silo, processing continues at 406. At 404, if the operation is to be processed using the silo view, the name of the key in the request is examined and is interpreted within the context of the silo. In some embodiments of the invention, a silo is provided a view of the registry having the same hierarchy as the underlying machine (that is, the silo's view appears to have the same hierarchy as the infrastructure or "system silo"). For example, if \registry\machine\software exists in the infrastructure, \registry\machine\software is exposed within the silo. This may be done so that applications which expect this hierarchy will find it. However, the files that back the hierarchy may be changed so that \registry\machine\software within the silo is actually a merge of the physical \registry\machine\software and \registry\machine\silo000software (the silo-specific registry). Normal error processing occurs. That is, if, for example, in an open operation, the key identified by the name in the access request is searched for but is not found in any of the target keys, an error message is returned. If a sub-key is found in an appropriate key, an open key is returned to the caller. Metadata may be attached before it is returned to the caller for a successful open or create. If the key is not found, the key is created or an error message is returned. At 408 the merge Registry key metadata for the silo is retrieved. At 410 if the requested name is not found in the merge Registry, processing proceeds as normal (406). For example, an error message may be returned stating that the key is not found. At 410, if the requested name is found in the merge Registry view, information is returned so that it can be determined whether the named key is to be created or opened (412). In some operating systems the "create operation" can be used both to open and to create keys. If the requested operation is an "open key" at 416, (i.e., the request is attempting to access an existing key) the operating system checks the private contributing key first by determining if the key exists in the private (unshareable portion) of the merge Registry. At 416 if the operating system determines that the key does not exist in the private portion of the virtual merge Registry, the public portion of the merge Registry is examined. If the key does not exist in the public portion of the merge Registry, an error message is returned. If the key is found in the merge Registry, the open key is returned. If at 412 it is determined that the key is to be created, (i.e., the request is a create key request) at 414, the operating system checks the public location to make sure that the key does not already exist in the public portion of the merge Registry. If it does, an error results. If it does not, the key is created in the private portion of the merge Registry, metadata is associated with the key and the created key is returned to the caller, along with the metadata.

In some embodiments of the invention, the metadata will be attached to the open key during RegNtPrePostCreate.

Referring again to FIG. 3, there are several different types of enumeration requests. If the operating system detects an enumeration request for the children of a key a list of keys are returned. At 314, if the operating system detects an enumerate key operation at 314, first, the operating system determines if there is metadata associated with the key (316). In some embodiments of the invention, (318) the operating system determines whether the Registry is merge view from the metadata. In either case, if the Registry is a merge view (318) the results of both keys merged together is returned (320). If the Registry is not a merge view, normal processing is performed. If the operation is a request for the value of a key (326), the values of the keys are returned (328). Global and private values for the key are merged.

If the operation is a query (322) (such as a request for the name or other information about the key) the physical name of the key is retrieved at 324 and the name is updated, if necessary, to reflect the proper name for the requester. In some instances, if a request for the name of a key is received or a request for other information about a key is received, the silo relative name rather than the global name of the key is returned.

If the operation encountered is a rename key (330) the operating system must ensure that the new name (the name to which the key is going to be renamed), which is a silo-relative name is translated into a global name before the underlying file system sees it so that the file system renames the key properly. If at 330 the operation is determined to be a close, the RegNtPreKeyHandleClose callback is invoked. At 332 any metadata associated with the key being closed is deleted. It will be appreciated that one or more of the above listed actions may be optional or skipped and that the actions may proceed in a sequence other than that depicted in FIG. 3.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A system for controlling sharing an operating system configuration store comprising:
   a computing device comprising a processor; and
   a memory having a communication path to said computing device when the system is operational, said memory having stored thereon computer executable instructions that upon execution by the processor cause the following:
   instantiate an operating system that provides a silo-specific view of the operating system configuration store for processes running in a silo, the operating system creating the silo-specific view by monitoring the operating system configuration store access requests initiating from the processes running in the silo and in response to detecting an access;
   callback processing that creates the silo-specific view of the operating system configuration store by merging silo-specific configuration resource information with resource information that is global to the operating system, the silo-specific view of the operating system configuration store being different than the silo-specific view of another silo instantiated on the same operating system so that silo-specific resources available to the silo are not available to another silo;
   receive, from a process of the processes running in the silo, a request to create a first key in the silo-specific configuration resource information of the silo-specific view of the operating system configuration store, the first key having a name;

in response to determining that a key with a same name as the first key exists in the resource information that is global to the operating system, determine not to fulfill the request to create the first key, and send an indication of the request to create the first key being unfulfilled to the process;

receive, from the process, a request to create a second key in the silo-specific configuration resource information of the silo-specific view of the operating system configuration store, the second key having a name;

in response to determining that no key with a same name as the second key exists in the resource information that is global to the operating system, create the second key in the silo-specific configuration resource information, and return an indication that the second key was created to the process.

2. The system of claim 1, wherein a resource described in the silo-specific view of the operating system configuration store is associated with a rank.

3. The system of claim 2, wherein the rank associated with each resource described in the silo-specific view of the operating system configuration store is used to determine a resource that is exposed.

4. The system of claim 1, wherein the operating system includes kernel operating system code that detects requests to the silo-specific view of the operating system configuration store via callbacks inserted in access request processing paths.

5. The system of claim 4, wherein the requests include a registry key access request comprising an open key request, a create key request, an enumerate file request, an enumerate key request, an enumerate key value request, a query key request, a query value request, a set value request, a modify security request, a key load request, a delete key request, a rename key request, or a close key request.

6. A method for providing a view of contributing registry keys to processes running in a silo comprising:

using a filter driver in an operating system to monitor processes running in the silo, wherein the filter driver detects a registry key access request made by a process running in the silo;

in response to detecting the registry key access request, performing processing associated with a type of registry key access request wherein the view of the contributing registry keys is provided to the process, wherein the view presents the values of the contributing registry keys to the process in a single registry key comprising entries of the contributing registry keys, the contributing registry keys include a first value comprising a global shared value stored in a global shared store and a second value comprising a silo-specific local unshared value stored in a silo-specific local unshared store, wherein the view of at least one registry key is a merged registry key comprising a global shared value and a local unshared value;

receiving, from a process of the processes running in the silo, a request to create a first key in the silo-specific local unshared store, the first key having a name;

in response to determining that a key with a same name as the first key exists in the global shared store, determining not to fulfill the request to create the first key, and sending an indication of the request to create the first key being unfulfilled to the process;

receiving, from the process, a request to create a second key in the silo-specific local unshared store, the second key having a name; and in response to determining that no key with a same name as the second key exists in the global shared store, creating the second key in the silo-specific local unshared store, and returning an indication that the second key was created to the process.

7. The method of claim 6, wherein selection of values for inclusion in the view depends on a rank associated with each of the contributing registry keys, wherein the rank is used as a tiebreaker when more than one entry in a registry directory is known by a particular name.

8. The method of claim 6, wherein in response to determining that the registry key access request is a create key operation or open key operation, metadata associated with the contributing registry keys is retrieved, and the local unshared value is examined first for a particular key specified in the registry key access request.

9. The method of claim 6, wherein in response to determining that the registry key request is an enumerate key value operation, the operating system returns the view, the view comprises a list of values comprising values from the contributing registry keys.

10. The method of claim 6, wherein in response to determining that the registry key access request is a rename key operation, the view is examined for existence of a new name to be used.

11. The method of claim 6, wherein in response to determining that the registry key access request is a close key operation, metadata associated with a key specified in the registry key access request is deleted.

12. The method of claim 6, wherein access of the process to global shared values is restricted to read-only access via creation of the view.

13. The method of claim 6, wherein access of the process to silo-specific local unshared values is read-write access.

14. A computer-readable storage medium that does not include signals having program code stored thereon that, when executed by a computing environment, causes the computing environment to:

use a filter driver of an operating system to monitor processes running in a silo, wherein the filter driver detects a registry key access request made by a process running in the silo;

in response to detecting the registry key access request, perform processing associated with a type of registry key access request wherein a view of a plurality of sets of registry keys is provided to the process, wherein the view presents a plurality of values of keys of the sets of the registry keys to the process as a single registry;

associate metadata with the view of the plurality of sets of registry keys, wherein the view comprises a plurality of keys, wherein a first portion of a key of the plurality of keys comprises value comprising a global key value stored in a global shared store and a second portion of the key comprises a silo-specific local unshared value stored in a silo-specific local unshared store, the metadata determining a degree of access to the first portion and the second portion, receiving, from a process of the processes running in the silo, a request to create a first key in the silo-specific local unshared store, the first key having a name;

in response to determining that a key with a same name as the first key exists in the global shared store, determining not to fulfill the request to create the first key, and sending an indication of the request to create the first key being unfulfilled to the process;

receiving, from the process, a request to create a second key in the silo-specific local unshared store, the second key having a name; and in response to determining that no key with a same name as the second key exists in the global shared store, creating the second key in the silo-specific local unshared store, and returning an indication that the second key was created to the process.

15. The computer-readable medium of claim 14, having further program code stored thereon, that when executed by the computing environment, causes the computing environment to:

examine the silo-specific local unshared value first for a key specified in the registry key access request when creating the view when the registry key access request is an open operation.

16. The computer-readable medium of claim 14, having further program code stored thereon, that when executed by the computing environment, causes the computing environment to:

examine the global key value first for a value of a key specified in the registry key access request when creating the view when the registry key access request is a create operation.

17. The computer-readable medium of claim 14, having further program code stored thereon, that when executed by the computing environment, causes the computing environment to:

enumerate entries comprising a union of a first set of keys and a second set of keys when the registry key access request is an enumeration operation.

18. The computer-readable medium of claim 14, having further program code stored thereon, that when executed by the computing environment, causes the computing environment to:

update a name of a key to reflect a resolvable name for a requestor, the requestor comprising a process inside a silo or a process outside the silo.

* * * * *